United States Patent [19]
Rose et al.

[11] Patent Number: 5,645,297
[45] Date of Patent: Jul. 8, 1997

[54] REGULATION OF PRESSURE IN AN AUTOMOTIVE AIRBAG MODULE

[75] Inventors: Larry D. Rose, Layton; Paul D. Kidd, Plain City; Joseph L. Ralston, North Ogden, all of Utah

[73] Assignee: Morton International, Inc., Chicago, Ill.

[21] Appl. No.: 517,783

[22] Filed: Aug. 22, 1995

[51] Int. Cl.⁶ ................................................ B60R 21/28
[52] U.S. Cl. ............................................................. 280/739
[58] Field of Search ............................. 280/736, 738, 280/739, 740, 742

[56] References Cited

U.S. PATENT DOCUMENTS

| | | | |
|---|---|---|---|
| 3,778,083 | 12/1973 | Hamasaki | 280/150 AB |
| 3,861,712 | 1/1975 | Matsui et al. | 280/150 AB |
| 3,888,508 | 6/1975 | Kizu et al. | 280/150 AB |
| 4,846,368 | 7/1989 | Goetz | 280/736 |
| 4,964,652 | 10/1990 | Karlow | 280/731 |
| 5,154,444 | 10/1992 | Nelson | 280/732 |
| 5,217,249 | 6/1993 | Kokeguchi | 280/728 |
| 5,226,670 | 7/1993 | Wright et al. | 280/738 |
| 5,269,561 | 12/1993 | Davis et al. | |

FOREIGN PATENT DOCUMENTS

| | | |
|---|---|---|
| 2093679 | 1/1972 | France. |
| 2669875 | 6/1992 | France. |
| 2163919 | 7/1972 | Germany. |

OTHER PUBLICATIONS

Patent Abstract of Japan, vol. 017, No. 212 (M–1402), 26 Apr. 1993 & JP–A–04 353051 (Nissan Motor Co. Ltd.).

*Primary Examiner*—Paul N. Dickson
*Attorney, Agent, or Firm*—Lawrence I. Field; Gerald K. White

[57] ABSTRACT

An automotive airbag module housing contains an inflator and a cushion to be inflated. When excessive pressure develops in the module housing, it is relieved through ports in the module housing. The ports are covered with a thin membrane or foil which ruptures before the excessive pressure can damage the airbag cushion during deployment, thereby relieving the pressure in the module housing and in the airbag and avoiding injury to the occupant of the automotive vehicle. The present invention is applicable to any airbag module in which an inflator is completely enclosed within the module housing. It is particularly applicable to passenger side airbag modules.

1 Claim, 1 Drawing Sheet

REGULATION OF PRESSURE IN AN AUTOMOTIVE AIRBAG MODULE

This invention relates to a pressure regulating system built into an airbag module. More particularly it consists of the provision of vent ports in the wall of the module housing in which the means for inflating the airbag are confined.

BACKGROUND OF THE INVENTION

Automotive airbags are presently inflated either (1) by gas generated from a pyrotechnic charge, or (2) by gas stored under pressure, or (3) by a combination of gas obtained from both sources. As described in U.S. Pat. Nos. 4,380,346; and 5,269,861, the disclosures of which are incorporated by this reference, the amount of inflation is influenced by the ambient temperature.

When the inflation is a hot event the bag is more aggressively and more fully inflated than when the inflation is a cold or normal event. When an airbag is fully inflated in a "hot" event it may be "too full" and is therefore too hard for a passenger. Previous efforts to avoid over-inflation include the following:

(1) Provision of vents in the airbag;
(2) Provision of orifices in the inflator as described in the above noted patents;
(3) Provision of weakened areas in the inflator housing, e.g. as described in U.S. Pat. Nos. 4,902,036 (Column 8, Lines 10 et. seq.) and 5,346,251.

None of the above has been found to be completely satisfactory. Vents in the airbag may open too much and allow the bag to deflate to the point where it is not effective as a passenger protection. The relief afforded by orifices in the inflator is limited by the pressure buildup which takes place in the housing in which the inflator is encased because the inflator is housed in the module housing which is not provided with any means to relieve the pressure. When weakened areas in the inflator housing rupture, pieces of metal may be ejected into the interior of the vehicle and may expose the occupant to injury. Therefore a need exists for an improved means for regulating the pressure in an airbag cushion during deployment of the airbag.

OBJECTS OF THE INVENTION

One object of the invention is to provide an improved means for regulating the pressure in an airbag module ensuring proper deployment of the airbag.

Another object is to provide vent ports in an airbag module housing to permit regulation of the pressure in said module when the airbag inflates and is deployed.

A further object of the invention is to provide vent ports, covered with a relatively thin membrane which is strong enough to hold the pressure generated during a normal deployment but which will rupture during a hot event as described in the above-noted patents.

DESCRIPTION OF THE DRAWINGS

These and other objects will be pointed out or will become apparent from the description which follows taken in conjunction with the drawings in which.

Figure 1:
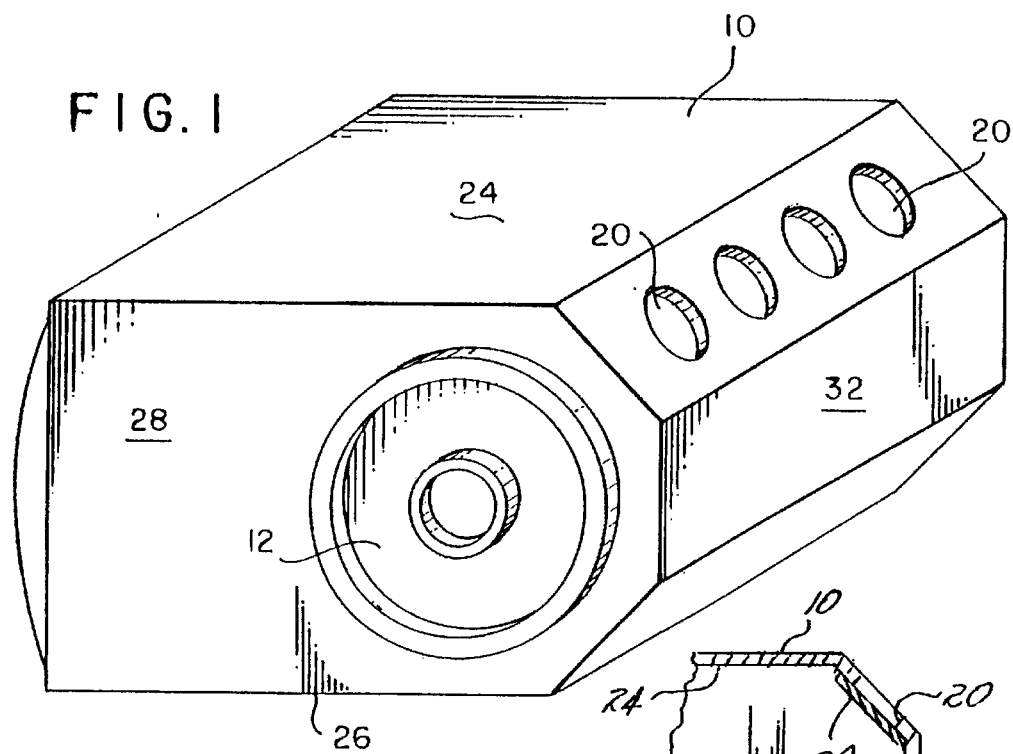
FIG. 1 is a view in perspective of an airbag module embodying the invention and FIG. 2 is a view like FIG. 1 with portions of the housing cut away.
Figure 3:
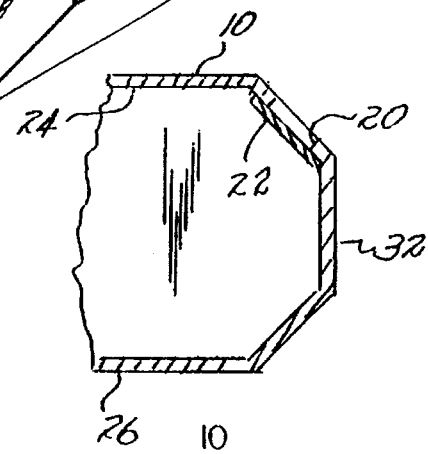
FIG. 3 is a fragmentary sectional view of the module of FIG. 1.
Figure 2:
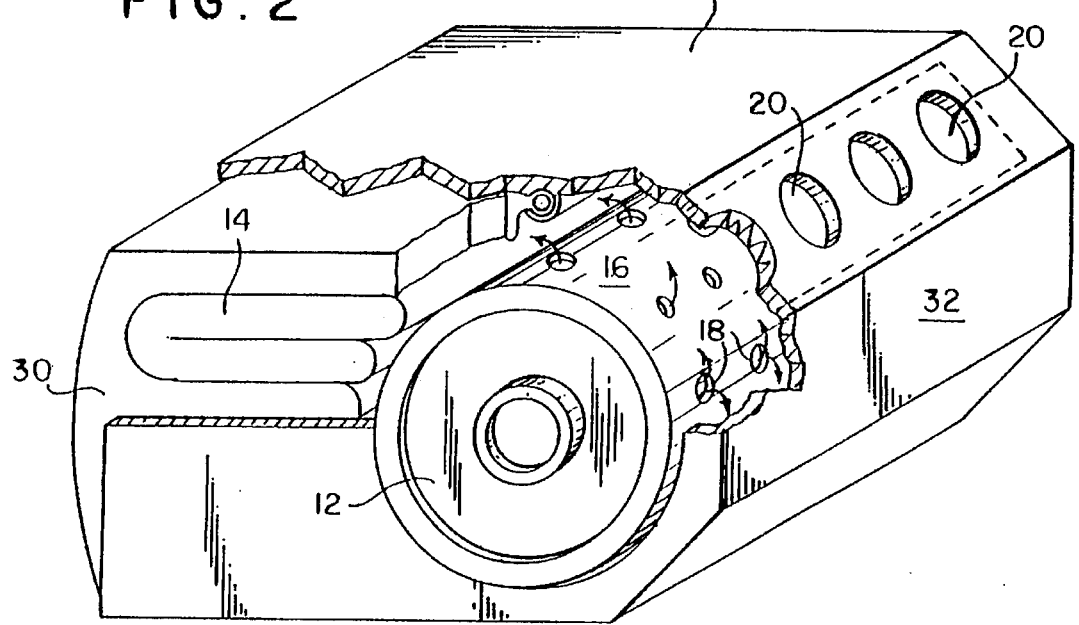

As shown in any of numerous U.S. patents including the following: U.S. Pat. Nos. 5,335,939; 5,342,084; 5,342,085; 5,398,960; 5,407,226; 5,407,227, typical automotive passenger airbag systems consist of a gas generator, cushion and housing. It can be seen that many systems use a cylindrical pyrotechnic type gas generator. One of the characteristics of a pyrotechnic is that as the environmental temperature increases, the rate of gas generation also increases. The change in burn rate causes a corresponding change in cushion deployment performance. During a hot temperature deployment, the cushion fills faster and more aggressively than during a cold or ambient (normal) temperature deployment, increasing stress on the cushion and housing. Since airbag modules must function at all temperature ranges, cushions and housing must be over-designed to meet the structural requirements of a hot deployment, even though most crash induced deployments occur around the normal range. This creates a need for a low cost method to reduce the stress levels on the cushion and housing when deployed hot.

THE INVENTION

The invention is a pressure regulating system built into the airbag housing. The invention consists of vent ports in the housing wall. Each vent port may be covered with a relatively thin membrane which is strong enough to withstand the pressure generated during a normal deployment yet rupture during a hot event. Since the vent ports are designed to exhaust gas and relieve pressure during a hot deployment, the forces and stress on the cushion and housing are reduced without impairing the protection afforded by the airbag cushion when it is deployed.

A preferred method of applying the invention is to position each port directly in the path of an inflator hot port from which gas exiting through the inflator port will forcefully impinge on, and rupture, the membrane. Since inflator hot ports only discharge gas at elevated temperatures, they are ideal for controlling membrane rupture. Also, as the environmental temperature increases, the number of inflator hot ports that discharge gas also increases proportionally. This means that during a warm deployment, a reduced number of housing vent port membranes are ruptured, thereby providing consistent housing pressure control.

An alternative method of applying the invention is to design the membrane to rupture at a specific housing pressure. This method would be preferable in situations where access to inflator hot ports was limited. This method would also be suitable for a stored gas type inflator which does not have discrete hot ports.

As shown in the drawings, an automotive airbag module housing 10 contains an inflator 12 and an undeployed, folded airbag cushion 14. Inflator 12 includes a casing 16 having ports 18. The housing 10 includes vent ports 20, covered by a thin foil 22. Vent ports 20 are disposed opposite at least some of the ports 18 in the inflator casing 16. Housing 10 may be of any well known shape. As shown in the figures, it has an upper surface 24, a lower surface 26 and sides 28. It may be provided with means to support the inflator e.g. as described in U.S. Pat. No. 5,342,084 issued to Rose et al. Aug. 30, 1994. Housing 10 also has an open rear 30 through which cushion 14 deploys when it inflates and a front wall 32 which may be a curved or planar surface.

The size of the vents and the thickness of the membrane or foil covering will, of course, depend on the pressure at which they are to rupture. As shown in FIG. 1, four ports approximately 20 millimeters in diameter are provided in a housing which has a width of about 250 millimeters. The membrane or foil covering thickness would be similar to the thickness of foil covering the inflator ports as described in the previously noted patents. 30. Having now described the present invention is it not intended that it be limited except as required by the appended claims.

We claim:

1. In an automotive passenger airbag module comprising a module housing having a wall, a gas generator disposed in said module housing and an inflatable cushion disposed in said module housing, the improvement which comprises: at least one vent port, provided in said wall in said module housing to relieve the pressure on said inflatable cushion during its inflation when a hot event occurs in the generation of gas to inflate the cushion and a thin membrane covering said at least one vent port, said wall being spaced from said gas generator, wherein said at least one vent port in the module housing is located directly in the path of gas exhausting through a gas generator hot port that is opposite to said at least one vent port.

* * * * *

UNITED STATES PATENT AND TRADEMARK OFFICE
CERTIFICATE OF CORRECTION

PATENT NO. : 5,645,297
DATED : 8 June 1997
INVENTOR(S) : Larry D. Rose, Paul D. Kidd and Joseph L. Ralston It is certified that error appears in the above-indentified patent and that said Letters Patent is hereby corrected as shown below:

At column 3, line 4, "patents. 30." should be --patents.--.

At column 4 line 1, "vent port," should be --vent port--.

Signed and Sealed this

Twenty-eighth Day of October, 1997

Attest:

Attesting Officer

BRUCE LEHMAN

Commissioner of Patents and Trademarks